United States Patent [19]

Wernicke

[11] 3,839,594

[45] Oct. 1, 1974

[54] ELECTRICAL HEATER CASE AND CABLE ATTACHMENT BOX THEREFOR

[75] Inventor: Walter H. Wernicke, Winnipeg, Manitoba, Canada

[73] Assignee: James B. Carter Ltd., Winnipeg, Manitoba, Canada

[22] Filed: Feb. 13, 1973

[21] Appl. No.: 332,150

[52] U.S. Cl................ 174/48, 219/213, 219/366
[51] Int. Cl............................................. H02g 3/22
[58] Field of Search........ 174/45, 49; 219/365, 366, 219/367, 368, 213, 345

[56] References Cited
UNITED STATES PATENTS
| | | | |
|---|---|---|---|
| 3,051,816 | 8/1962 | Knoll et al. | 219/213 X |
| 3,211,889 | 10/1965 | McEachron | 219/345 |
| 3,543,003 | 11/1970 | Dinchel et al. | 219/367 X |

*Primary Examiner*—J. V. Truhe
*Assistant Examiner*—David A. Tone
*Attorney, Agent, or Firm*—Stanley G. Ade

[57] ABSTRACT

A casing for longitudinally extending electrical heating elements or other electrical apparatus, provided with a pair of connector box flanges set forwardly from the rear panel and spanning an aperture in the panel and being situated adjacent the rear corners of a similar aperture formed in the base. The connector box includes a back plate and a base plate extending therefrom together with flanges on the base plate and on the back plate. The conventional electrical connector can be secured in either the back plate or the base plate through knock-outs provided and the heater casing is offered up to the box and secured by a pair of screws so that the entire connector is contained within the box forwardly of the rear surface of the back panel or upwardly from the base of the casing so that the casing can be situated flush with the wall without having to enlarge the hole in the wall or floor through which the cable extends. Attachment is also considerably simplified insasmuch as the connection can be made to the connector box with the casing removed therefrom.

11 Claims, 5 Drawing Figures

PATENTED OCT 1 1974 3,839,594

ELECTRICAL HEATER CASE AND CABLE ATTACHMENT BOX THEREFOR

BACKGROUND OF THE INVENTION

This invention relates to new and useful improvements in electrical casings and cable attachment boxes therefor, designed primarily for use with longitudinally extending electrical heaters which are mounted permanently flush with the wall and upon the floor. However the invention can be used with any electrical apparatus casing rewiring cable connections from a surface upon or against which the casing registers.

Conventionally, such casings include a connector box formed integrally with the casing through which the electrical cable is secured by means of a conventional cable connector. If the cable is connected through the rear panel of the casing, the connector extends rearwardly of the rear surface of the panel so that the hole in the wall through which the cable extends, has to be enlarged so that this connector will slip therein thus allowing the casing to be placed flush with the wall.

In situations where the wiring connection is through the floor, a similar problem arises as the casings normally sit flush upon the floor and against the wall.

There is considerable difficulty experienced in connecting the connector to the casing particularly in cases where the casing of, for example, and electrical heater may extend six or eight feet and the installer usually requires assistance so that the connector can be inserted through the wall of the box with the ring nut being attached to the front of the connector.

Another disadvantage is the danger inherent in enlarging the hole in the wall or floor through which the cable extends under which circumstances a chisel or the like is utilized and which may readily damage the cable during the enlarging operation.

Furthermore, the electrical code requires that the gauge of metal supporting the connector be sufficient to supply the necessary strength so that the entire casing is usually made from this relatively heavy gauge material whereas a lighter gauge would be adequate for the majority of the casing.

SUMMARY OF THE INVENTION

The present invention overcomes these disadvantages by providing a connector box which can be detachably secured to the casing by means of a pair of screws thus enabling the electrical connector to be attached to the connector box with the remainder of the casing removed after which the casing is offered up to the connector box and attached simply so that the entire connector is enclosed within the box set forwardly of the rear surface of the casing. This permits the casing to be placed flush against the wall without the necessity of enlarging the hole to receive the rear of the electrical connector.

The principal object and essence of the invention is therefore to provide a device of the character herewithin described in which the cable connector box is readily separable from the casing thus facilitating the attachment of the cable connector to the connector box.

Another object of the invention is to provide a device of the character herewithin described in which the connector box is situated forwardly of the rear surface of the casing so that the rearwardly extending portion of the cable connector is enclosed within the box and also forwardly of the rear surface of the casing, thus eliminating the necessity of enlarging the hole through which the cable extends in order to receive the extending portion of the electrical connector.

Another object of the invention is to provide a device of the character herewithin described which enables the electrical connection to be made either from a cable extending from the wall or from a cable extending upwardly from the floor.

A still further object of the invention is to provide a device of the character herewithin described in which the connector box can be manufactured from metal, the gauge of which is sufficient to meet electrical codes, yet at the same time permitting the main casing to be manufactured from a lighter gauge metal.

A still further object of the invention is to provide a device of the character herewithin described which is simple in construction, economical in manufacture and otherwise well suited to the purpose for which it is designed.

With the foregoing objects in view, and other such objects and advantages as will become apparent to those skilled in the art to which this invention relates as this specification proceeds, my invention consists essentially in the arrangement and construction of parts all as hereinafter more particularly described, reference being had to the accompanying drawings in which:

DESCRIPTION OF THE DRAWINGS

In the drawings like characters of reference indicate corresponding parts in the different figures.

DETAILED DESCRIPTION

Figure 1:
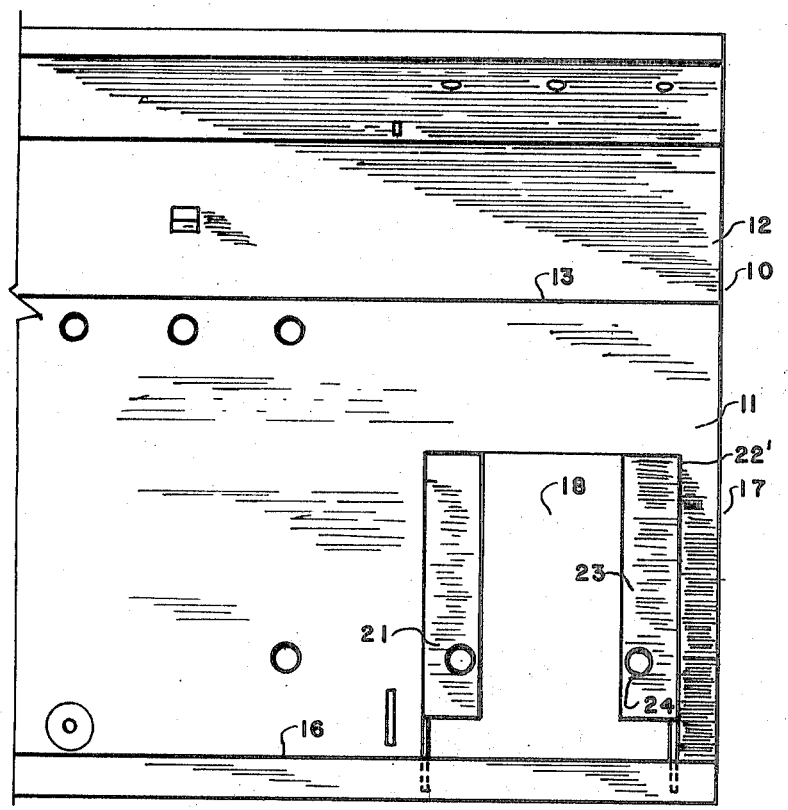
FIG. 1 is a front elevation of one end of an electrical heater casing with the element removed for clarity.
Figure 2:
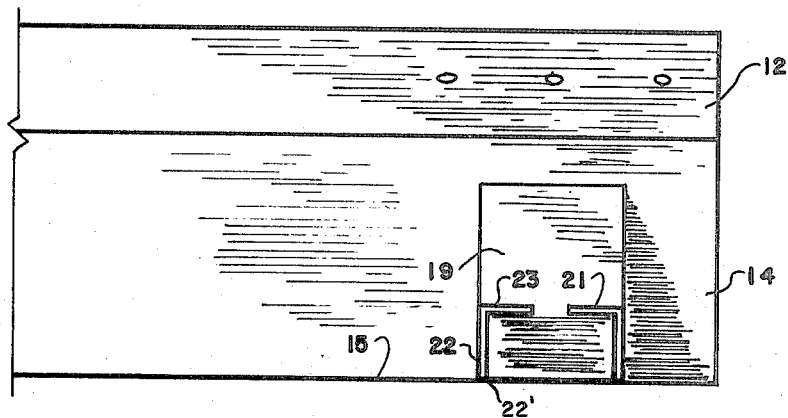
FIG. 2 is a bottom plan view of FIG. 1.
Figure 3:
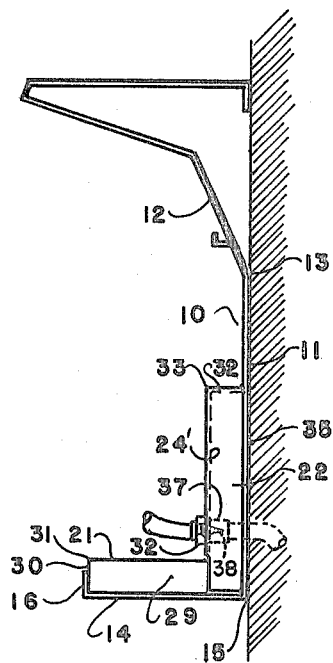
FIG. 3 is an end view of FIG. 1.
Figure 4:
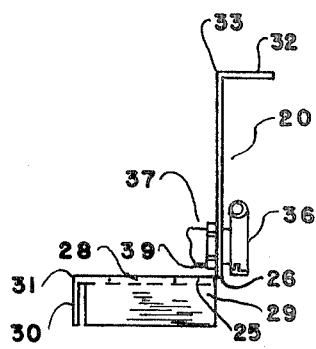
FIG. 4 is an end view of the connector box per se.

Proceeding therefore to describe the invention in detail, reference character 10 illustrates one end of the casing of a longitudinally extending electrical heater, it being understood that the other end is similar in construction.

The casing includes the substantially vertical longitudinally extending rear panel 11, a longitudinally extending shroud portion 12 formed on the upper edge 13 of the rear panel 11, and a horizontally situated, longitudinally extending base 14 extending forwardly at right angles from the lower longitudinal edge 15 of the rear panel 11. The base terminates in an upturned flange 16 as clearly shown.

Adjacent the end 17 of the casing, a substantially rectangular opening or aperture 18 is formed and a similar aperture 19 is formed in the base 14 vertically below the aperture 18.

Means are provided to support a connector box assembly collectively designated 20, said means taking the form of a pair of angulated flanges 21 extending forwardly from the side edges 22' of aperture 18 and including the forwardly extending portions 22 and the horizontally extending portions 23, the horizontally extending portions facing inwardly towards one another as clearly shown.

Attachment screw apertures 24 are provided through the horizontally extending portions 23 as illustrated.

The connector box assembly 20 includes a substantially rectangular rear plate 24' and a substantially rectangular base plate 25 extending forwardly from the lower edge 26 of the rear plate. Both the rear plate and the base plate are provided with conventional knock-out type apertures 27 and 28 and the base plate 25 is provided with downwardly extending flanges 29 extending from the side edges of base plate and a downwardly extending flange 30 extending from the front edge 31 of the base plate.

Figure 5:
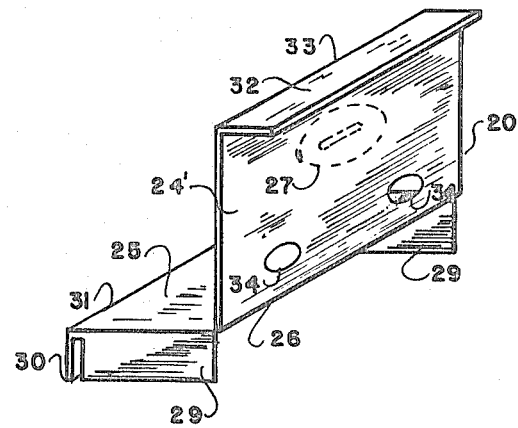
FIG. 5 is an isometric view of the connector box per se.

The rear plate 24' is provided with a flange 32 extending at right angles from the upper edge 33 thereof as clearly illustrated in FIG. 5.

Self-tapping screw apertures 34 are provided within the back plate 24' adapted to align with apertures 24 on the flanges 21 when the box assembly is in position.

The box assembly is adapted to extend through the aperture 18 within the rear panel 11 of the heater casing so that the rear plate 24' engages the horizontally extending flanges 23 being supported upon the base 14 by means of the downwardly depending flanges 29 of the base plate 25. The front flange 30 of this base plate engages against the upturned flange 16 and the flange 32 spans the upper ends of the portions 22 of the flanges 21. From the foregoing it will be appreciated that the flanges 22 of the heater casing together with the back plate 24' and the upper flange 32 form an enclosure with an open rear side, said enclosure being situated entirely forwardly of the rear surface 35 of the heater casing. Furthermore, the base plate 25 together with the flanges 29 and 30 of the connector box 20 form an enclosure with an open base, upon the base 14 of the heater casing also situated entirely forwardly of the rear surface 35, and the depth of flanges 22 and 29 are such that they will completely enclose the rear side 36 of a conventional cable connector 37 when installed through either knock-out 27 or 28 and when in position, the connector box 20 is secured by means of screws 28 engaging through apertures 24 and apertures 34.

This connector box may be made of heavier gauge material than the remainder of the heater casing 10 thus complying with electrical codes, yet showing economy of manufacture.

In operation, the connector box 20 is disconnected from the heater casing which is moved away from the installing location. The electrical cable (not illustrated) normally extends through a hole in the wall or floor (not illustrated) and the relevant knock-out 27 or 28 is removed from the connector box 20 depending upon the location of the electrical cable.

The conventional electrical connector 37 is then engaged with the casing either through the rear plate 24' or base plate 25 and the cable is secured therein in the usual manner. In this connection, the connector 37 is usually held in place by means of a ring-type nut 39.

The manipulation of the connector is relatively simply due to the small size of the connector box per se and also due to the fact that the connector is readily accessible from front and rear during this operation.

Once the cable is installed, the heater casing is engaged with the connector box 20 so that the apertures 24 and 34 are in alignment whereupon screws 38 are inserted thus sucuring the heater casing 10 to the connector box 20. Once installed, as hereinbefore described, the connector 37 is contained entirely within the connector box either adjacent the rear plate 24' thereof or the base plate 25 thereof, thus permitting the heater casing to be pushed flush against the wall without the necessity of having to enlarge the aperture in the wall through which the cable extends.

Although the foregoing description and drawings describe and illustrate the invention as applied to an electrical heater of the type normally used in buidlings against the walls thereof, nevertheless it will be appreciated that the invention can be used for attachment on an electrical cable to a casing containing any electrical apparatus which is designed to be supported either against or upon a flat surface such as a wall or floor. Examples may include electrical switch boxes, electrical panels of the various assorts and also electrical heaters which are mounted within a wall surface so that the front of the heater is flush with the wall with the back panel recessed therein.

The majority of these circumstances will permit the electrical connector to be contained within the confines of the rear end or base wall of the casing thus not only facilitating installation because the connector box is detachable but also enabling such devices to be move conveniently installed.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A casing for electrical apparatus attachable to a source of electrical energy through a cable and a cable connector; sand casing including a back panel, and a base extending forwardly of the lower edge of said back panel; at least one connector box aperture in said back panel, a connector box assembly detachably secured to said back panel and within said aperture, said connector box assembly having at least one knock-out aperture for attachment of said connector, and means to position said connector box forwardly of the rear surface of said back panel to enclose the associated cable connector forwardly of the rear surface of said back panel.

2. The casing according to claim 1 in which said means includes a pair of attaching flanges defining two sides of said aperture and being spaced forwardly of said back panel.

3. The casing according to claim 2 in which said connector box assembly includes a rear plate, a base plate extending at right angles from the lower edge of said rear plate, flanges depending at right angles from the front and side edges of said base plate and a flange extending rearwardly at right angles from the upper edge of said rear plate.

4. The casing according to claim 3 in which said flange, said rear plate and said pair of attaching flanges form an enclosure for the associated cable connector when same is secured through said rear plate, said base plate and said depending flanges forming an enclosure when the associated connector extends through said base plate.

5. The casing according to claim 1 in which said connector box assembly includes a rear plate, a base plate extending at right angles from the lower edge of said rear plate, flanges depending at right angles from the front and side edges of said base plate and a flange extending rearwardly at right angles from the upper edge of said rear plate.

6. In a casing for electrical apparatus attachable to a source of electrical energy through a cable and a cable connector, said casing including a back panel, and a base extending forwardly of the lower edge of said back panel, the improvement which includes the provision of at least one connector box aperture in said back panel, a connector box assembly detachably secured to the back panel and within said aperture, said connector box assembly having at least one knock-out aperture for attachment of the associated connector, and means to position said connector box forwardly of the rear surface of said back panel to enclose the associated cable connector forwardly of the rear surface of the said back panel.

7. The casing according to claim 6 in which said means includes a pair of attaching flanges defining two sides of said aperture and being spaced forwardly of said back panel.

8. The casing according to claim 7 in which said connector box assembly indludes a rear plate, a base plate extending at right angles from the lower edge of said rear plate, flanges depending at right angles from the front and side edges of said base plate and a flange extending rearwardly at right angles from the upper edge of said rear plate.

9. The casing according to claim 8 in which said flange, said rear plate and said pair of attaching flanges form an enclosure for the associated cable connector when same is secured through said rear plate, said base plate and said depending flanges forming an enclosure when the associated connector extends through said base plate.

10. The casing according to claim 6 in which said connector box assembly includes a rear plate, a base plate extending at right angles from the lower edge of said rear plate, flanges depending at right angles from the front and side edges of said base plate and a flange extending rearwardly at right angles from the upper edge of said rear plate.

11. A connector box assembly for use with a casing for electrical apparatus which are attachable to a source of electrical energy through a cable and a cable connector, said casing including a back panel and a base panel, said connector box assembly being secured to the back panel through an aperture formed therein, said connector box assembly including a rear plate, a base plate extending at right angles from the lower edge of said rear plate, flanges depending at right angles from the front and side edges of said base plate and a flange extending rearwardly at right angles from the upper edge of said rear plate.

* * * * *